Oct. 10, 1933.   W. N. GILBERT   1,930,268

SCALE BEARING

Filed May 12, 1928

Inventor
Wm. N. Gilbert
By his Attorney

Patented Oct. 10, 1933

1,930,268

UNITED STATES PATENT OFFICE 1,930,268

SCALE BEARING

William N. Gilbert, Hudson Heights, N. J., assignor, by mesne assignments, to International Business Machines Corporation, New York, N. Y., a corporation of New York Application May 12, 1928. Serial No. 277,141

10 Claims. (Cl. 308—2)

This invention relates to weighing scales and more particularly to improvements in the bearing parts thereof.

The object of the invention is the provision of improved means for fastening a bearing member to its supporting structure.

Another object is the provision of a new thrust plate to be applied to a bearing member.

Still another object is the provision of a method of applying said thrust plate to the bearing member without the use of screws, pins, or other extraneous fastening means.

Various other objects and advantages of my invention will be obvious from the following particular description of one form of mechanism embodying the invention or from an inspection of the accompanying drawing; and the invention also constitutes certain new and novel features of construction and combination of parts hereinafter set forth and claimed.

Figure 1:
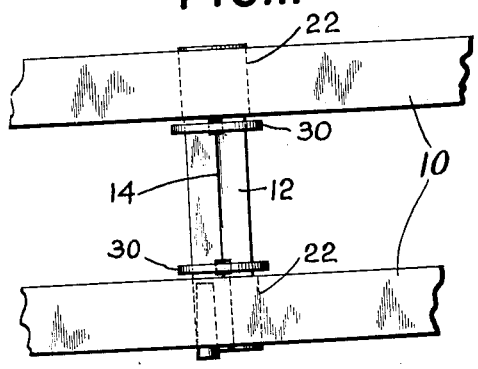
Fig. 1 is a plan view of a knife edge bearing member fastened to a lever in accordance with the invention.
Figure 2:
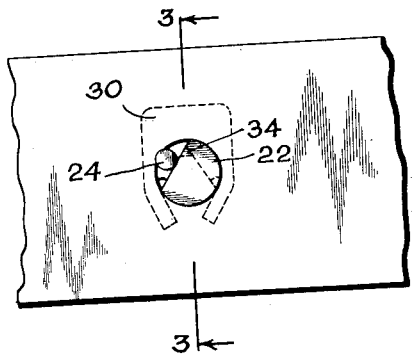
Fig. 2 is a side view of Fig. 1.
Figure 3:
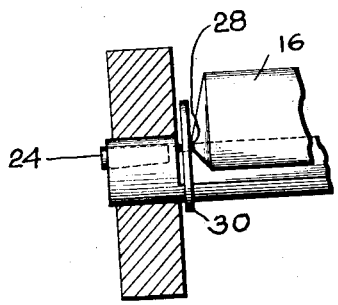
Fig. 3 is a section in line 3—3 of Fig. 2 with the bearing cooperating with the knife edge bearing in position.
Figure 5:
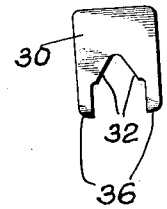
Fig. 5 is a detail of the thrust plate to be affixed to said bearing member.
Figure 4:
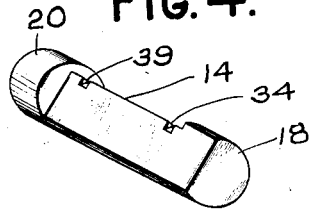
Fig. 4 is a detail of the knife edge bearing member.

Referring to the drawing, Fig. 1 shows a lever having furcations 10 for carrying a knife edge bearing member 12. The latter is made from a round tapered pin in which two intersecting sides are cut intermediately to form a knife edge 14 for supporting a bearing member 16. One of the intersecting sides of the knife edge is extended to the larger end of the pin while the other intersecting side is terminated short of said end, thereby forming a segmental end portion 18 at the larger end. The smaller end of the pin is left completely round to provide a circular portion 20.

The furcations 10 of the lever are formed with alined tapered holes 22, the taper of the hole in one furcation being an extension of the taper of the other hole. The end portions of the knife edge bearing member are adapted to seat in said tapered holes. The bearing is assembled in the lever by driving it into the holes 22. A taper pin 24 is then forced into the hole in which the segmental end portion is seated, wedging itself between the side of the hole and the flat side of the segmental portion and driving the bearing member more firmly into the openings 22. This provides a simple and convenient means of fixing the bearing member in the lever support and permits ready adjustment for alinement by merely loosening the wedge pin. The method and means for assembling the bearing member in the lever requires a minimum of the simplest of mechanical operations.

In order to prevent the sides of the bearing member 16 adapted to rest on the knife edge 14 from rubbing against the sides of the lever and introducing friction as a weighing factor, the sides of the bearing member 16 are formed with points 28 adapted to abut against hardened steel plates 30. These plates are bifurcated to straddle the flat sides of the knife edge bearing member, the sides 32 of the furcation fitting against the sides of the knife edge member. The thrust plates seat in notches 34 adjacent the end portions of the bearing member which retain the plates in fixed longitudinal position on the knife edge.

After the plates are seated in the notches, the legs 36 are bent towards each other, thus preventing removal of the plates from the knife edge bearing. The thrust plates are thus fixed in position on the bearing member after the latter is assembled on the lever, without the use of screws or other extraneous fastening means.

It is understood that while the modification disclosed has been provided with tapered openings in the lever furcations and the knife edge bearing has been formed from a tapered pin, that the taper of the openings or the taper of the pin or both may be omitted and the bearing be wedged into the openings entirely by the action of taper pin 24.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only as indicated by the scope of the following claims.

I claim:

1. In a device of the class described, a scale member provided with a round hole, a one-piece bearing element for rockably supporting a cooperating bearing element, the bearing elements having V-shaped inter-engaging surfaces, said one-piece bearing element having a portion formed as a segment provided with a flat side, said segment fitting snugly against the wall of said round hole, and a tapered block adapted to be driven between the flat side of said segment and the wall of said hole to fix the one-piece bearing element firmly in said member.

2. In a device of the class described, a pair of coacting bearing members, a support for one of said members, said latter member having a notch therein, and a thrust plate seated in said notch and serving to prevent frictional contact between the side of the other of said bearing members and the support.

3. In a device of the class described, a bearing member, a support therefor, a second bearing member adapted to coact with the first-named bearing member, said first-named member being formed with intersecting sides to form a knife edge, a notch formed in the intersection of said sides, and a thrust plate mounted in said notch and engaging said intersecting sides, said plate serving to prevent frictional contact between the second bearing member and said support.

4. A device comprising a lever provided with a round uninterrupted opening therein, a one-piece knife edge member having a segmental portion and a circular portion of substantially the same diameter as said opening fitting into said opening to rotatably mount the knife edge member relative to the lever, and an element adapted to be inserted axially of the lever opening between said segmental portion and the wall of the opening to prevent relative rotative movement of the knife edge member with respect to the lever.

5. In a device of the class described, a lever having a round uninterrupted opening, a bearing member having a segmental portion seated in said opening, means for wedging said segmental portion in said opening, a knife edge in said bearing member, a bearing element pivoted on said knife edge, and a thrust plate on said bearing member to prevent frictional contact between said bearing element and said lever.

6. In a device of the class described, a bearing member and a thrust plate provided with integral lugs adapted to be bodily bent towards each other in a manner to substantially retain their initial shape for holding the thrust plate on the bearing member.

7. In a device of the class described, a bearing element a bearing member for supporting said element and provided with a notch and an end thrust plate having a portion seated in said notch and integral portions provided on said thrust plate for holding the thrust plate on the bearing member, said thrust plate being adapted to freely engage one end of the bearing element to prevent movement of said element in one direction only.

8. In a device of the class described, a support, a bearing member carried thereby, an element rockably supported on said member, and a thrust plate secured to and completely carried by said member and having integral portions embracing said member, said integral portions coacting with said member to hold the plate thereon against removal solely by themselves and independently of the support, said plate being positioned between said support and said element to prevent frictional engagement of the element with said support.

9. In a device of the class described, a support having a round opening, a bearing element formed with intersecting sides to provide a knife edge, one of the ends of said element having a portion of its periphery arcuate-shaped, another portion of said periphery being flat and a continuation of one of the aforesaid knife edge sides, said end being adapted to seat in said opening with a space between said flat portion and the wall of said opening, and a wedge adapted to be driven into said space to hold the bearing element rigidly in said support.

10. In a device of the class described, a scale member, a V-bearing, a coacting V-bearing element carried by said member, a thrust plate embracing said element and inter-engaging portions on the plate and element adapted solely by themselves and independently of the aforesaid member for retaining the plate, said thrust plate extending between the end of said bearing and the scale member to prevent shifting of the bearing in the direction of its rocking axis.

WILLIAM N. GILBERT.